(12) United States Patent
Katamata et al.

(10) Patent No.: US 10,689,198 B2
(45) Date of Patent: Jun. 23, 2020

(54) CONVEYOR APPARATUS

(71) Applicants: Furukawa Industrial Machinery Systems Co., Ltd., Chiyoda-ku, Tokyo (JP); Bando Chemical Industries, Ltd., Kobe-shi, Hyogo (JP)

(72) Inventors: Hiromi Katamata, Oyama (JP); Tsuyoshi Kitazawa, Oyama (JP); Ayumu Yokomaku, Oyama (JP); Akihisa Fujikake, Oyama (JP); Atsushi Fujita, Kobe (JP)

(73) Assignees: Furukawa Industrial Machinery Systems Co., Ltd., Tokyo (JP); Bando Chemical Industries, Ltd., Hyogo (JP)

( * ) Notice: Subject to any disclaimer, the term of this patent is extended or adjusted under 35 U.S.C. 154(b) by 0 days.

(21) Appl. No.: 16/313,523

(22) PCT Filed: Jun. 28, 2017

(86) PCT No.: PCT/JP2017/023792
§ 371 (c)(1),
(2) Date: Dec. 27, 2018

(87) PCT Pub. No.: WO2018/003874
PCT Pub. Date: Jan. 4, 2018

(65) Prior Publication Data
US 2019/0161278 A1    May 30, 2019

(30) Foreign Application Priority Data
Jul. 1, 2016    (JP) .................................. 2016-131999

(51) Int. Cl.
*B65G 15/02*    (2006.01)
*B65G 15/08*    (2006.01)
*B65G 39/12*    (2006.01)

(52) U.S. Cl.
CPC ............. *B65G 15/02* (2013.01); *B65G 15/08* (2013.01); *B65G 39/12* (2013.01);
(Continued)

(58) Field of Classification Search
CPC ......... B65G 15/02; B65G 15/08; B65G 39/12
(Continued)

(56) References Cited

U.S. PATENT DOCUMENTS 3,332,535 A * 7/1967 Hubert ................. B65G 17/126
                                                  198/703
4,197,916 A * 4/1980 Haverdink ............. A01D 17/06
                                                   15/3.11
(Continued)

FOREIGN PATENT DOCUMENTS

CN        2496823 Y     6/2002
CN      101473105 A     7/2009
(Continued)

OTHER PUBLICATIONS

English Translation of International Preliminary Report on Patentability in corresponding Japanese Patent Application No. PCT/JP2017/023792, dated Jan. 10, 2019.
(Continued)

*Primary Examiner* — Douglas A Hess
(74) *Attorney, Agent, or Firm* — Young Basile Hanlon & MacFarlane, P.C.

(57) ABSTRACT

A conveyor apparatus includes an endless conveyor belt wound around outgoing path side guide pulleys in turn along a helical conveyance path in a bent state where the belt is folded in two in a width direction such that an upper edge portion thereof is supported by the outgoing path side guide pulleys, and wound around returning path side guide pulleys in turn along the helical conveyance path in the bent state where the belt is folded in two in the width direction such
(Continued)

that the upper edge portion is supported by the returning path side guide pulleys, and folded back at each turning positions of a horizontal conveyance unit located at an upper side and a horizontal conveyance unit located at a lower side of the support frame and being in an expanded state where the belt expanded in the width direction in a vicinity of the turning position.

4 Claims, 9 Drawing Sheets

(52) U.S. Cl.
CPC .... *B65G 2201/045* (2013.01); *B65G 2201/06* (2013.01); *B65G 2812/02128* (2013.01)

(58) Field of Classification Search
USPC ................................ 198/778, 804, 819, 834
See application file for complete search history.

(56) References Cited

U.S. PATENT DOCUMENTS

| | | | | |
|---|---|---|---|---|
| 4,359,149 | A * | 11/1982 | Erlichman | B65G 47/5113 198/347.1 |
| 4,371,075 | A * | 2/1983 | Erlichman | B65G 37/02 198/345.3 |
| 4,505,382 | A * | 3/1985 | Mareau | B65G 15/08 198/819 |
| 4,809,844 | A * | 3/1989 | Hashimoto | B65G 15/08 198/819 |
| 4,823,941 | A * | 4/1989 | Mindich | B65G 15/08 198/819 |
| 4,852,720 | A * | 8/1989 | Roinestad | B65G 21/18 198/778 |
| 4,915,213 | A | 4/1990 | Loodberg et al. | |
| 5,246,102 | A * | 9/1993 | Rappen | B65G 15/08 198/819 |
| 5,413,213 | A * | 5/1995 | Golz | A24C 5/35 198/778 |
| 5,909,798 | A * | 6/1999 | Shaver | B65H 1/28 198/603 |
| 7,000,758 | B2 * | 2/2006 | Bjorklund | B65G 15/08 198/716 |
| 9,434,549 | B2 * | 9/2016 | Balk | B65G 21/14 |
| 9,573,763 | B2 * | 2/2017 | Lurie | B65G 23/14 |
| 9,688,482 | B2 * | 6/2017 | Beesley | B65G 47/682 |
| 9,771,219 | B2 * | 9/2017 | Muller | B29D 29/06 |
| 9,884,723 | B2 * | 2/2018 | Neely | B65G 17/086 |

FOREIGN PATENT DOCUMENTS

| | | |
|---|---|---|
| JP | S63-501865 A | 7/1988 |
| JP | S63-189307 A | 8/1988 |
| JP | H01-098510 A | 4/1989 |
| JP | H09-020412 A | 1/1997 |
| JP | H09-040130 A | 2/1997 |
| JP | H09-100012 A | 4/1997 |
| JP | H11-334827 A | 12/1999 |
| WO | 89/03354 A1 | 4/1989 |

OTHER PUBLICATIONS

Japanese Office Action in corresponding Japanese Patent Application No. 2018-150486, dated Jul. 16, 2019, and its English translation, 8 pgs.
Extended European Search Report in related EP Application No. 17820228.9, dated Feb. 6, 2020, 8 pgs.
Chinese Office Action in corresponding Chinese Patent Application No. 201780041182.9, dated Apr. 9, 2020, and its English translation, 15 pgs.

* cited by examiner

CONVEYOR APPARATUS

TECHNICAL FIELD

The present invention relates to a conveyor apparatus suitably usable for carrying soil excavated from an underground excavation site through a vertical shaft or an inclined shaft to the ground through a shaft.

BACKGROUND

For example, in a shield tunneling method, after establishing a vertical shaft of a predetermined depth, a shield excavator is introduced through the vertical shaft, and the underground is excavated by this excavator. In this type of underground construction, it is common to elevate the excavation soil generated by excavation from the inside of the tunnel to the ground through the vertical shaft and discharge the soil from a soil discharge position on the ground by a dump truck or the like.

Herein, when carrying excavation soil using a belt conveyor, depending on a conventional belt conveyor, there is a limit to the tilt angle at which soil can be conveyed. For this reason, conventionally, various types of lifting equipment have been separately required when transporting excavation soil via the vertical shaft or the inclined shaft.

Therefore, to cope with such a problem, for example, Japanese Patent No. H09-020412 discloses a conveyor apparatus suitable for carrying excavation soil from an excavation site to the above ground through a vertical shaft.

For example, Japanese Patent No. H09-020412 describes that a conveying member is equipped in a vertical conveyance unit in a circulatable manner, and the conveying member is configured to scoop a conveyance object fed from a lower horizontal conveyance unit into the vertical conveyance unit and deliver the conveyance object to the upper horizontal conveyance unit.

BRIEF SUMMARY

However, the technology described in Japanese Patent No. H09-020412 requires the conveying member in the vertical conveyance unit that carries the excavation soil separately from the conveyor apparatus. Therefore, the structure of the conveyor apparatus becomes complicated.

Also, with the technology described in Japanese Patent No. H09-020412, there is a problem that the spillage of the cargo tends to occur because the conveying member faces upside down on the return side of the vertical conveyance unit.

Therefore, the present invention has been made focusing on such a problem, and it is an object of the present invention to provide a conveyor apparatus suitable for continuous conveyance in the vertical direction without causing complicated device configuration and any spillage of cargo.

In order to achieve the object mentioned above, according to an aspect of the present invention, there is provided a conveyor apparatus including: a plurality of outgoing path side guide pulleys and a plurality of returning path side guide pulleys disposed along a helical conveyance path extending in a vertical direction and arranged at positions where inflection points of the conveyance path are formed such that the plurality of outgoing path side guide pulleys and the plurality of returning path side guide pulleys form the inflection points; an endless conveyor belt wound around the plurality of outgoing path side guide pulleys in turn along the helical conveyance path in a bent state where the endless conveyor belt is folded in two in a width direction in such a manner that an upper edge portion of the endless conveyor belt is supported by the plurality of outgoing path side guide pulleys, the endless conveyor belt being wound around the plurality of returning path side guide pulleys in turn along the helical conveyance path in the bent state where the endless conveyor belt is folded in two in the width direction in such a manner that the upper edge portion is supported by the plurality of returning path side guide pulleys, and further, the endless conveyor belt being folded back at turning positions of an upper side and a lower side of the conveyance path and being in an expanded state where the endless conveyor belt is expanded in the width direction in a vicinity of each of the turning positions; a pair of an upper side turning pulley and a lower side turning pulley configured to support and guide the conveyor belt to stretch at the respective turning positions; and a drive motor configured to drive at least one of the plurality of outgoing path side guide pulleys, the plurality of returning path side guide pulleys, and the pair of upper side turning pulley and the lower side turning pulley.

According to this conveyor apparatus, the conveyor belt circulates endlessly by driving the drive motor, and excavation soil is placed on the conveyor belt in the expanded state in the vicinity of the turning position on the lower side of the conveyance path. Then, when the conveyor belt shifts to the bent state where the conveyor belt is folded in two in the width direction, the conveyor belt holds the placed excavation soil to surround the excavation soil, and while keeping its holding state, the conveyor belt can convey the excavation soil toward the upper side of the conveyance path along the helical conveyance path on the outgoing path side.

Furthermore, in the vicinity of the turning position on the upper side of the conveyance path, the conveyor belt is made to be in the expanded state again from the bent state to unload the excavation soil from the conveyor belt and continuously lift soil, and furthermore, Furthermore, the conveyor belt can be returned from the expanded state to the bent state again and return to the returning route.

Therefore, it is possible to provide a conveyor apparatus suitable for continuous conveyance in the vertical direction without making a complicated device configuration.

Furthermore, according to this conveyor apparatus, in both of the outgoing path side and the returning path side, the conveyor belt is in the bent state where the conveyor belt is folded in two in the width direction in the conveyance excluding the vicinity of the turning position, and therefore, the conveyor belt can be held to surround the excavation soil, and can prevent or suppress the spillage of the cargo. In addition, the conveyor belt can lift soil by conveying the excavation soil at the outgoing path side, and convey other items such as materials on the returning path side where the excavation soil has been removed.

In the conveyor apparatus described above, the positions where the inflection points are formed are preferably set at corner portions of the polygonal shape when viewed from above.

In the conveyor apparatus described above, the positions where the inflection points are formed are preferably set at corner portions of a support frame having an axis extending in a vertical direction and having a polygonal shape when viewed from above.

According to this conveyor apparatus, a portion forming the inflection point is set at the corner portion of the support frame having the polygonal shape, and the outgoing path side guide pulley and the returning path side guide pulley can be disposed at the corner portion of the support frame.

Further, in the above-described conveyor apparatus, the support frame preferably include a plurality of support shafts disposed such that their axes extend in a vertical direction, and disposed such that the plurality of support shafts form a polygonal shape transverse section, and the plurality of outgoing path side guide pulleys and the returning path side guide pulleys are preferably disposed on the plurality of support shafts positioned at corner portions of the support frame.

According to this conveyor apparatus, it is possible to appropriately arrange a plurality of outgoing path side guide pulleys and returning path side guide pulleys after constructing the support frame with a simple structure.

Furthermore, in the conveyor apparatus described above, the upper edge portion of the conveyor belt in the bent state where the conveyor belts is folded in two in the width direction is preferably supported by a plurality of conveyor belt support mechanisms, and each of the conveyor belt support mechanisms includes a roller support plate attached to each of a plurality of support shafts positioned between the corner portions of the support frame to protrude outwardly, an outer side support roller attached to the position of the outer side spaced from the support shaft of the roller support plate, and an inner side support roller attached to the inner side position with respect to the outer side support roller of the roller support plate, and it is preferable to sandwich and support, from the outside and inside, the upper edge portion of the conveyor belt in a bent state where the conveyor belt is folded in two in the width direction by the outer side support roller and the inner side support roller.

According to this conveyor apparatus, the upper edge portion of the bent state conveyor belt folded in two in the width direction is supported by the plurality of conveyor belt support mechanisms. Therefore, it is possible to reliably maintain the bent state of the conveyor belt. Since each of the conveyor belt support mechanisms sandwiches and supports, from the outside and inside, the upper edge portion of the bent state conveyor belt folded in two in the width direction with the outer side support roller and the inner side support roller, the running resistance of the conveyor belt can be reduced.

In the conveyor apparatus described above, the drive motor is preferably provided in a dispersed manner at some locations among positions of the plurality of outgoing path side guide pulleys, the plurality of returning path side guide pulleys, the upper side turning pulley, and the lower side turning pulley.

According to this conveyor apparatus, since the drive motors are disposed in a dispersed manner, the tension of the conveyor belt can be reduced and a high lift conveyance can be realized.

According to the conveyor apparatus of the present invention, it is possible to provide a conveyor apparatus suitable for continuous conveyance in the vertical direction without causing complicated device configuration and any spillage of cargo.

BRIEF DESCRIPTION OF THE DRAWINGS

FIG. 9A illustrates a right side view and FIG. 9B illustrates a front view.

DETAILED DESCRIPTION OF THE EMBODIMENTS

An embodiment of the present invention will be described below with reference to FIGS. 1 to 10.

Figure 1:
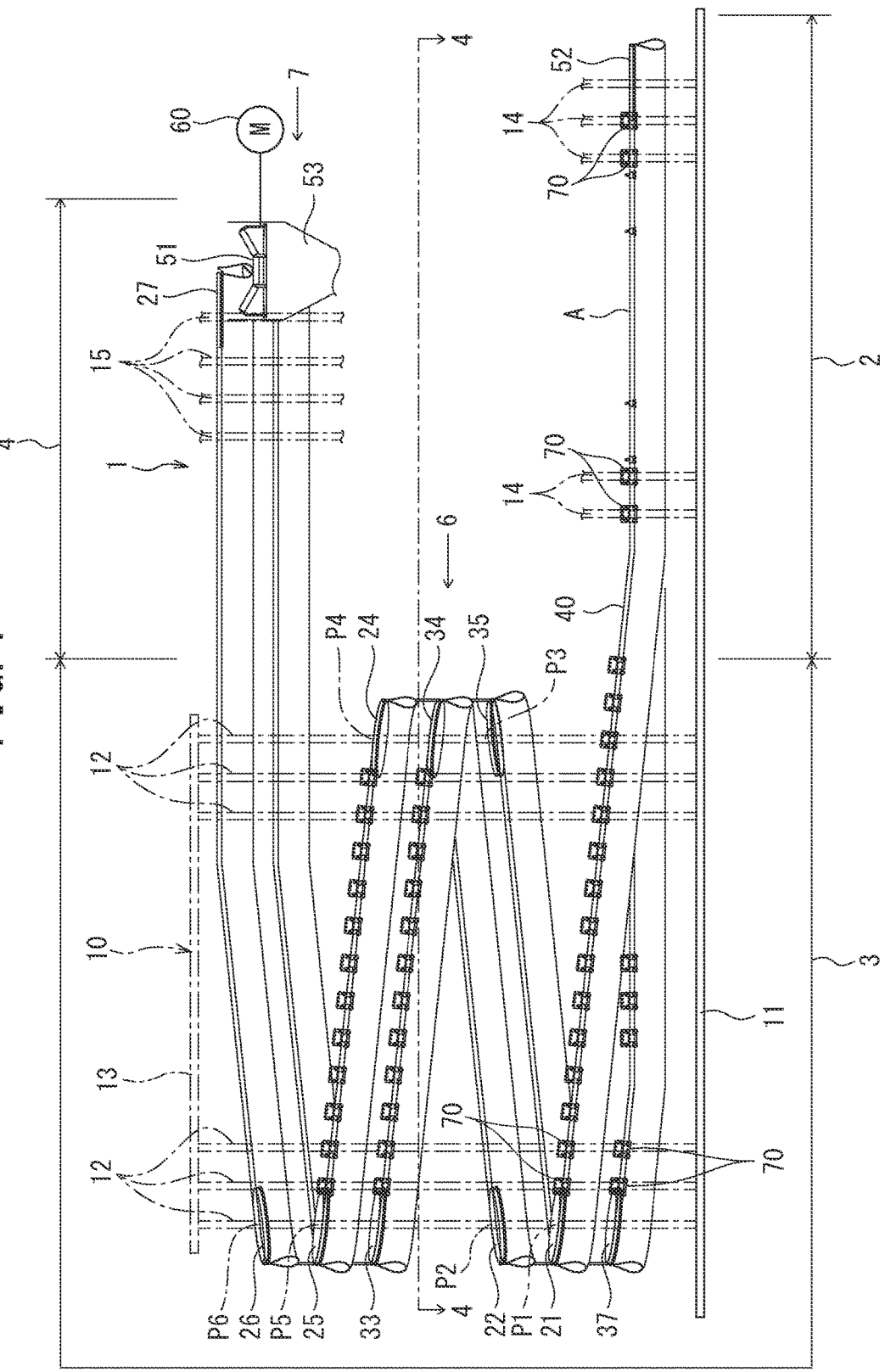
FIG. 1 is a schematic front view illustrating a conveyor apparatus according to an embodiment of the present invention.
Figure 2:
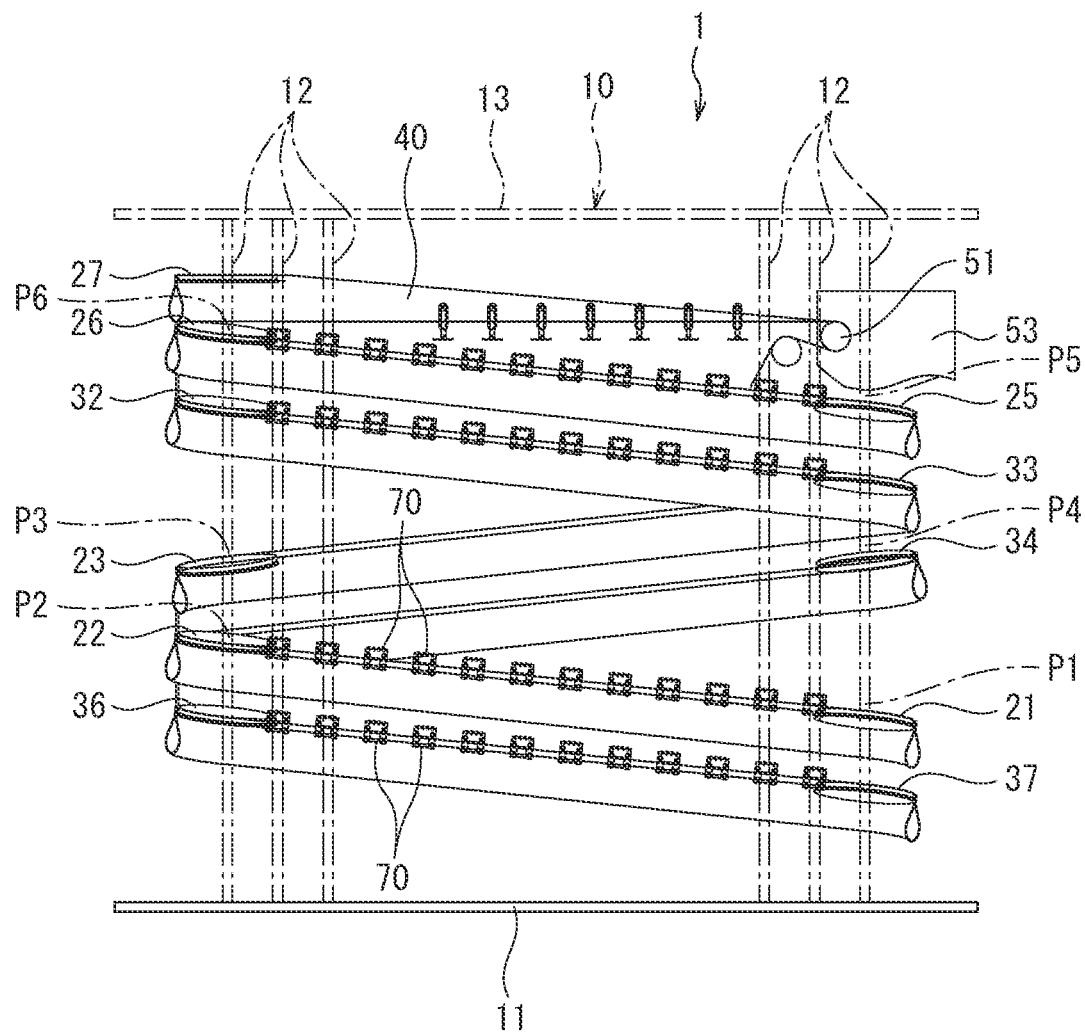
FIG. 2 is a schematic left side view illustrating a conveyor apparatus illustrated in FIG. 1.

The conveyor apparatus 1 illustrated in FIG. 1 is used to carry soil excavated from the underground excavation site via a vertical shaft or an inclined shaft to the ground via the vertical shaft, and includes a horizontal conveyance unit 2 located on the lower side within the vertical shaft, a vertical conveyance unit 3 extending vertically within the vertical shaft, and a horizontal conveyance unit 4 located on the ground.

In this conveyor apparatus 1, as illustrated in FIG. 1 to FIG. 6, a plurality of outgoing path side first to sixth guide pulleys 21 to 26 and returning path side second to seventh guide pulleys 32 to 37 forming inflection points P11 to P16 of conveyance path are disposed along the vertically extending helical conveyance path and at positions P1 to P6 where the inflection points P11 to P16 are formed, in the vertical conveyance unit 3.

In the present embodiment, the positions P1 to P6 forming the inflection points P11 to P16 of the conveyance path are set at corner portions of a quadrangular shape when viewed from above and are set in such a manner that the axis extends in the vertical direction and are set at corner portions of the support frame 10 having a quadrangular shape when viewed from above.

As illustrated in FIG. 1 to FIG. 6, the support frame 10 includes a plurality of support shafts 12 disposed in such a manner that their axes extend in a vertical direction and the plurality of support shafts 12 are disposed at a predetermined pitch such that the plurality of support shafts 12 form a quadrangular shape transverse section. Each support shaft 12 has a lower end fixed to the bottom plate 11 and an upper end fixed to the top plate 13.

The four support shafts 12 positioned at the corner portions of the support frame 10 where the positions P1 to P6 forming the inflection points P11 to P16 of the conveyance path are set respectively include a plurality of (in the present embodiment, six) outgoing path side first to sixth guide pulleys 21 to 26 and a plurality of (in this embodiment, six) returning path side second to seventh guide pulleys 32 to 37.

Specific arrangement of these outgoing path side first to sixth guide pulleys 21 to 26 and returning path side second to seventh guide pulleys 32 to 37 will be described. At the lower part of the support shaft 12 disposed at the lower left corner portion in FIG. 4, the outgoing path side first guide pulley 21 is disposed on the upper side, and the returning path side seventh guide pulley 37 is disposed on the lower side. Also, at the position of the support shaft 12 disposed at the upper left corner portion in FIG. 4 and upper than the outgoing path side first guide pulley 21, the outgoing path side second guide pulley 22 is disposed on the upper side, and the returning path side sixth guide pulley 36 is disposed on the lower side. Similarly, at the position of the support shaft 12 disposed at the upper right corner portion in FIG. 4 and upper than the outgoing path side second guide pulley 22, the outgoing path side third guide pulley 23 is disposed on the upper side, and the returning path side fifth guide pulley 35 is disposed on the lower side. Also, at the position of the support shaft 12 disposed at the lower right corner portion in FIG. 5 and upper than the outgoing path side third guide pulley 23, the outgoing path side fourth guide pulley 24 is disposed on the upper side, and the returning path side fourth guide pulley 34 is disposed the lower side. Also, at the position of the support shaft 12 arranged at the lower left corner portion in FIG. 5 and upper than the outgoing path side fourth guide pulley 24, the outgoing path side fifth guide pulley 25 is arranged on the upper side, and the returning path side third guide pulley 33 is arranged on the lower side. Further, at the position of the support shaft 12 disposed at the upper left corner portion in FIG. 5 and upper than the outgoing path side fifth guide pulley 25, the outgoing path side sixth guide pulley 26 is disposed on the upper side, and the returning path side second guide pulley 32 is disposed on the lower side.

More specifically, the outgoing path side first to sixth guide pulleys 21 to 26 are provided at positions spirally gradually raising along the outer circumference of the rectangular support frame 10 to spirally raise the conveyor belt 40. Also, the returning path side second to seventh guide pulleys 32 to 37 are provided at positions spirally gradually descending along the outer circumference of the rectangular support frame 10 to spirally descend the conveyor belt 40.

Figure 3:
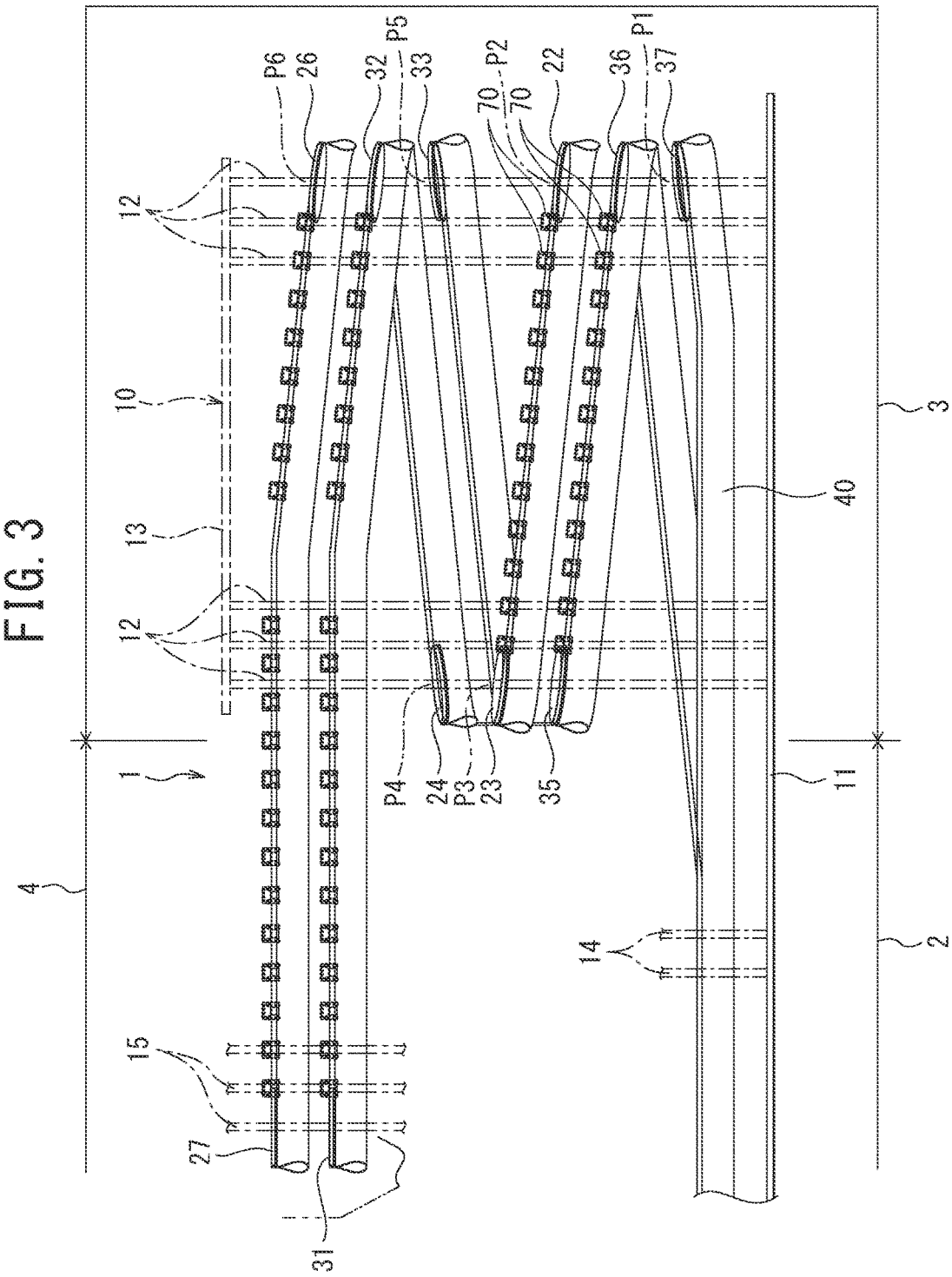
FIG. 3 is a schematic rear view illustrating a conveyor apparatus illustrated in FIG. 1.
Figure 5:
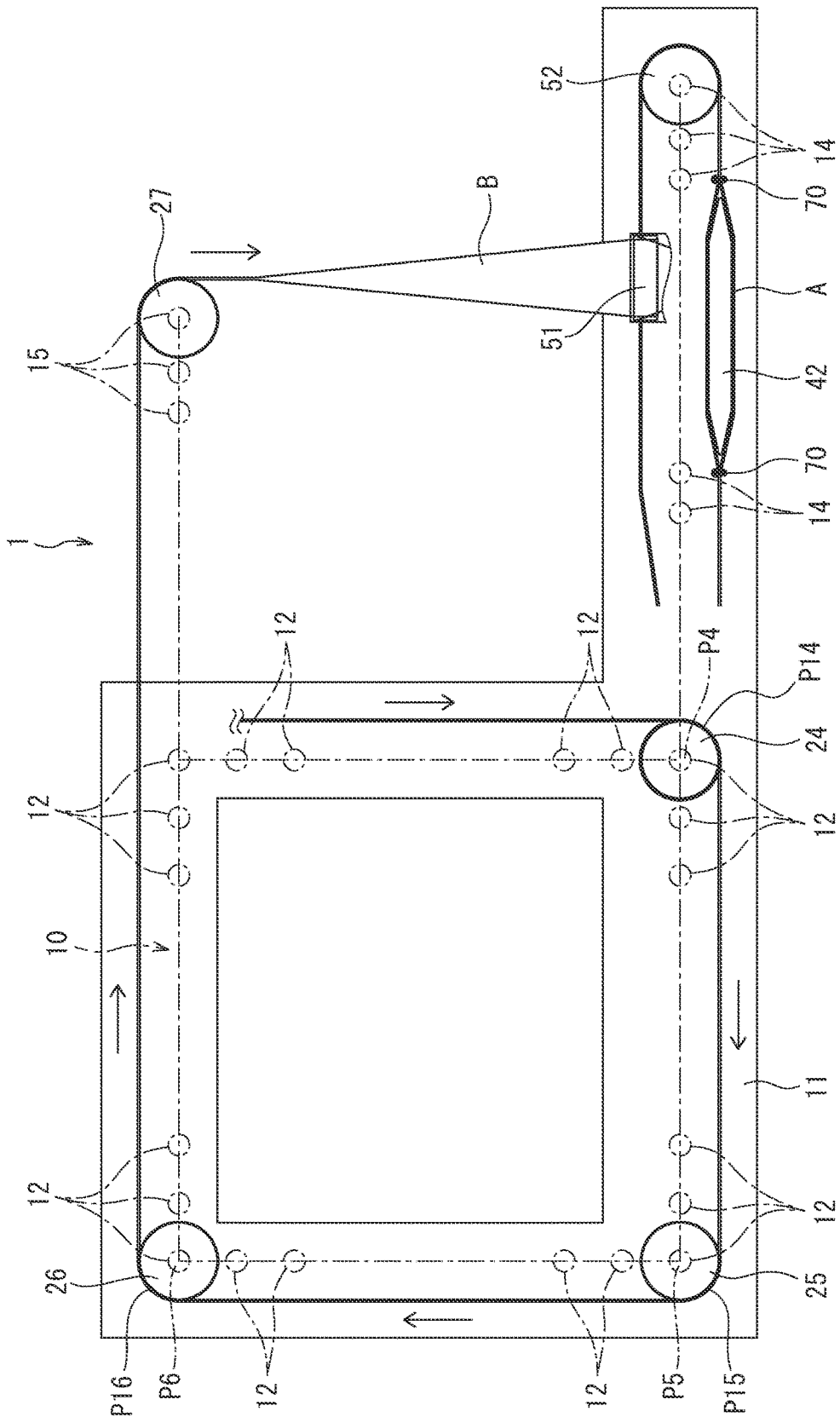
FIG. 5 is a schematic plan view illustrating a conveyor apparatus illustrated in FIG. 1.
Figure 6:
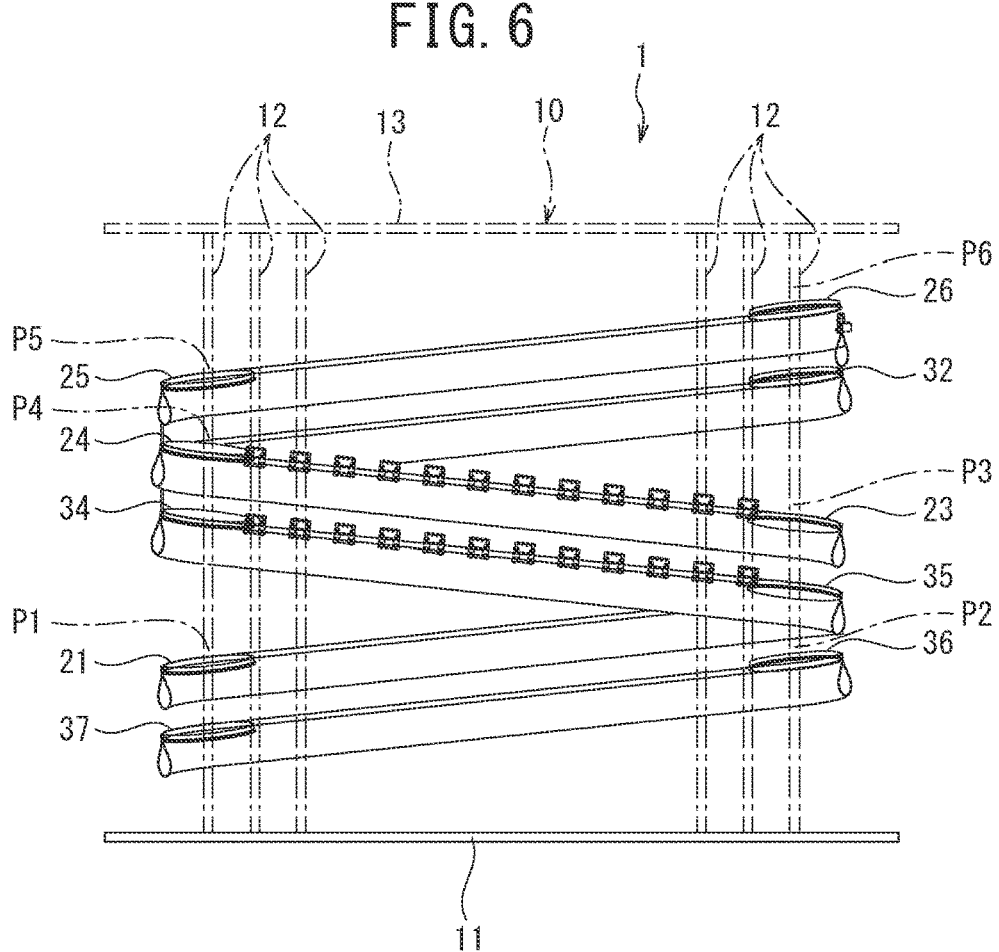
FIG. 6 is a view as seen from the direction indicated by an arrow 6 in FIG. 1.

As illustrated in FIG. 1, FIG. 3 and FIG. 5, a plurality of support shafts 15 are provided in the horizontal conveyance unit 4 positioned on the ground to extend in the installation direction of the support shaft 12. On the endmost support shaft 15, the outgoing path side seventh guide pulley 27 is arranged on the upper side, and the returning path side first guide pulley 31 is arranged on the lower side.

Herein, the outgoing path side first to sixth guide pulleys 21 to 26 are inclined with respect to the horizontal direction along a helical conveyance path and are rotatable around the respective support shafts 12. Each of the returning path side second to seventh guide pulleys 32 to 37 is inclined with respect to the horizontal direction along a helical conveyance path, and is rotatable about each support shaft 12. The outgoing path side seventh guide pulley 27 is rotatable around the support shaft 15. The returning path side first guide pulley 31 is rotatable around the support shaft 15.

The conveyor apparatus 1 also has an endless conveyor belt 40. This conveyor belt 40 is wound around the outer circumference of the outgoing path side first to seventh guide pulleys 21 to 27 in turn along a helical conveyance path in a bent state where the conveyor belt folded in two in a width direction in such a manner that the upper edge portion 41 of the conveyor belt is supported by the outer circumference of the outgoing path side first to seventh guide pulleys. Also, the conveyor belt 40 is wound around the outer circumference of the returning path side first to seventh guide pulleys 31 to 37 in turn along a helical conveyance path in the bent state where the conveyor belt folded in two in a width direction in such a manner that the upper edge portion 41 is supported by the outer circumference of the returning path side first to seventh guide pulley. The conveyor belt 40 is folded back at each turning position of the horizontal conveyance unit 4 positioned on the upper side of the conveyance path and the horizontal conveyance unit 2 positioned on the lower side of the conveyance path.

Herein, an upper side turning pulley 51 is provided at the turning position of the horizontal conveyance unit 4 positioned at the upper side of the conveyance path as illustrated in FIG. 1 and FIG. 5. The upper side turning pulley 51 guides the conveyor belt 40 while supporting the conveyor belt 40 to stretch at the turning position. The upper side turning pulley 51 is rotatably supported on the support member 53. Also, as illustrated in FIG. 1 and FIG. 5, a lower side turning pulley 52 is provided at the turning position of the horizontal conveyance unit 2 positioned on the lower side of the conveyance path. The lower side turning pulley 52 guides the conveyor belt 40 while supporting the conveyor belt 40 to stretch at the turning position. The lower side turning pulley 52 is rotatably supported on the support shaft 14.

Figure 7:
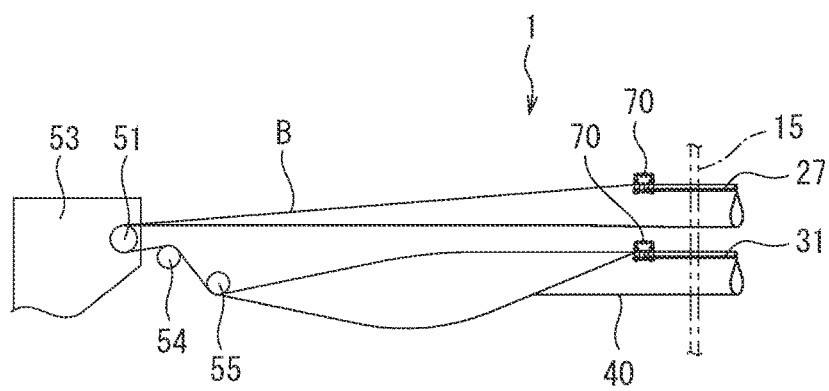
FIG. 7 is a view as seen from the direction indicated by an arrow 7 in FIG. 1.

As illustrated in FIG. 5, at the outgoing path side, the conveyor belt 40 is wound around the outer circumference of the outgoing path side seventh guide pulley 27 in the bent state where the conveyor belt is folded in two in the width direction to turn 90 degrees, and is caused to be in an expanded state where the conveyor belt is expanded in the width direction in the vicinity B of the turning position of the horizontal conveyance unit 4 positioned at the upper side of the conveyance path, and is folded back still in the expanded state with upper side turning pulley 51. Then, after the conveyor belt 40 is folded back in the expanded state with the upper side turning pulley 51, as illustrated in FIG. 7, the conveyor belt 40 passes through the guide rollers 54, 55 to be in the bent state where the conveyor belt is folded in two in the width direction on the front side of the returning path side first guide pulley 31, and is wound around the returning path side first guide pulley 31.

Figure 4:
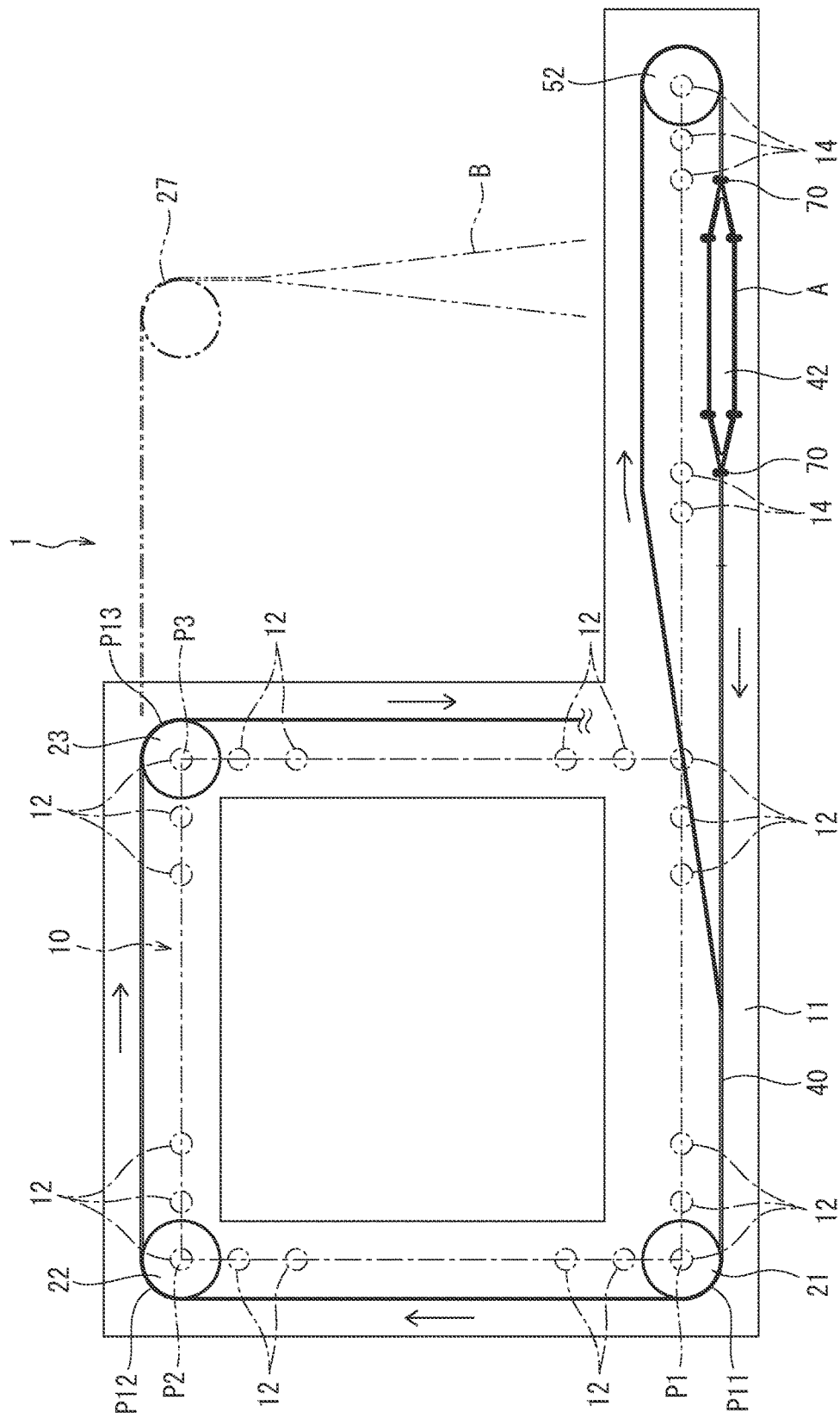
FIG. 4 is a schematic view taken along the line 4-4 in FIG. 1.

Further, as illustrated in FIG. 4, the conveyor belt 40 is folded back at the returning path side with the lower side turning pulley 52 in the bent state where the conveyor belt is folded in two in the width direction, and thereafter, the conveyor belt 40 is once caused to be in the expanded state where the conveyor belt is expanded in the width direction in the vicinity A of the turning position of the horizontal conveyance unit 2 positioned on the lower side of the conveyance path. Then, the conveyor belt 40 is again wound around the outer circumference of the outgoing path side first guide pulley 21 in the bent state where the conveyor belt is folded in two in the width direction. How to perform reciprocating conveyance and expansion of the conveyor belt 40 will be described in detail later.

As illustrated in FIG. 1, a drive motor 60 for driving the upper side turning pulley 51 is connected to the upper side turning pulley 51. Although not illustrated, a plurality of drive motors for driving the guide pulley are also dispersedly arranged in the outgoing path side first guide pulley 21, the outgoing path side third guide pulley 23, and the outgoing path side fifth guide pulley 25.

In addition, the upper edge portion of the bent state conveyor belt 40 folded in two in the width direction is supported by a plurality of conveyor belt support mechanisms 70.

Figure 9A:
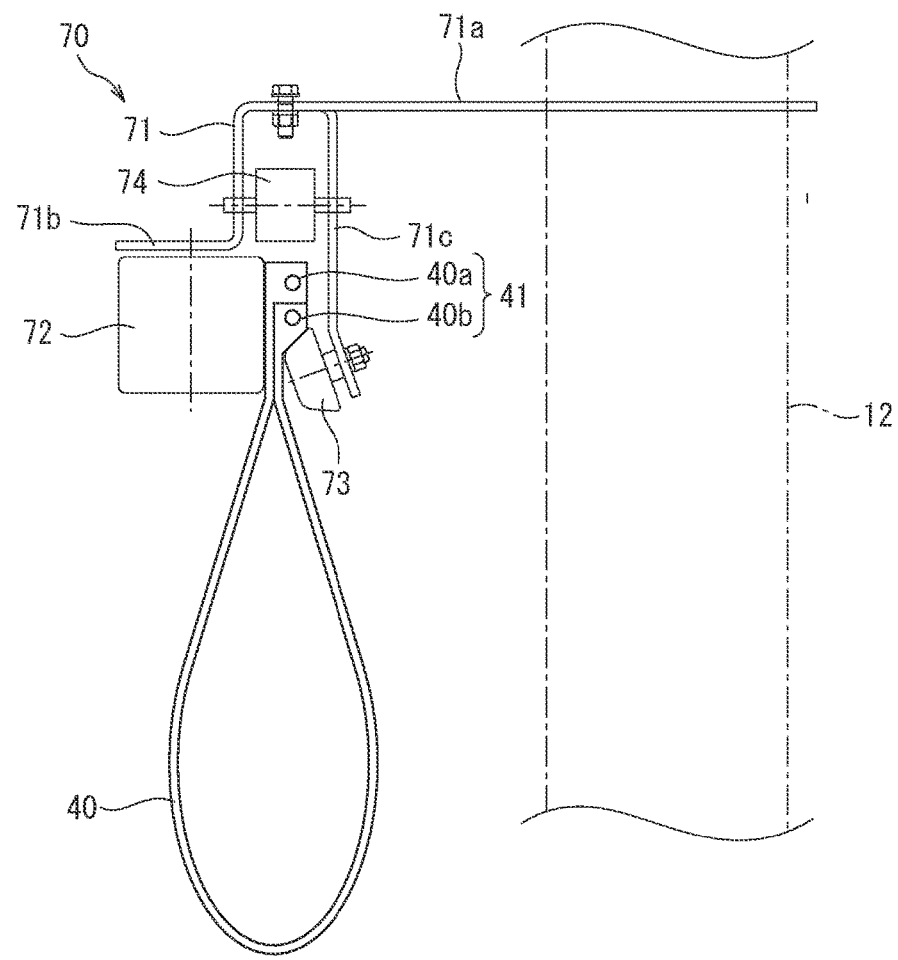
FIGS. 9A and 9B illustrate how to support the upper edge portion of the conveyor belt in the bent state where the conveyor belt is folded in two in the width direction by the conveyor belt support mechanism, and where
Figure 9B:
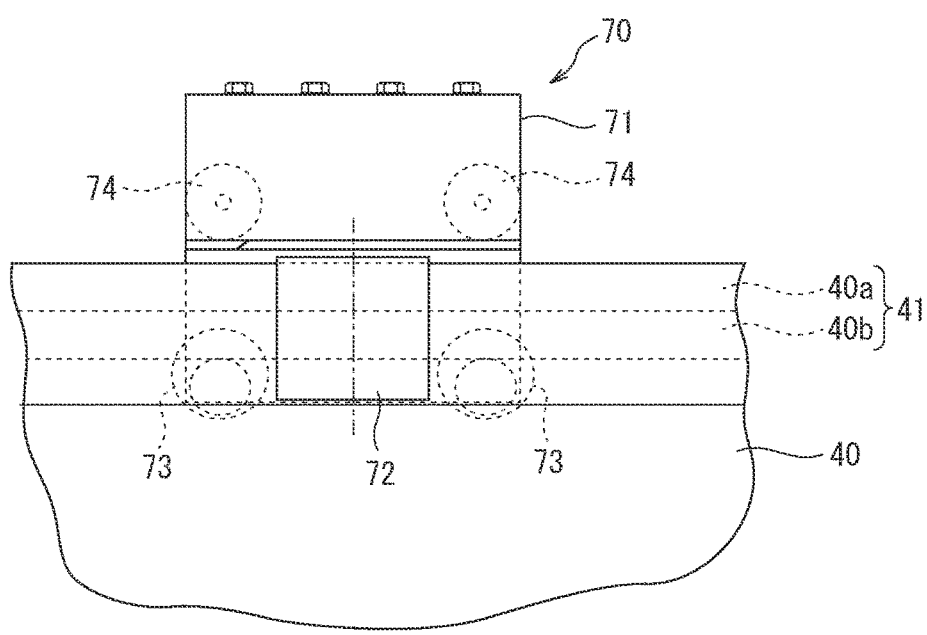

In the vertical conveyance unit 3, each conveyor belt support mechanism 70 is attached to each of the plurality of support shafts 12 positioned between the corner portions of the support frame. As illustrated in FIGS. 9A and 9B, each conveyor belt support mechanism 70 includes a roller support plate 71 attached to each support shaft 12 to protrude outwardly, an outer side support roller 72 attached to the position of the outer side spaced from the support shaft 12 of the roller support plate 71, and an inner side support roller 73 attached to the position of the inner side with respect to the outer side support roller 72 of the roller support plate 71. The upper edge portion 41 of the conveyor belt 40 in the bent state where the conveyor belt is folded in two in the width direction constituted of an end portion 40a on one side of the conveyor belt 40 and an end portion 40b on the other side is sandwiched and supported by the outer side support roller 72 and the inner side support roller 73 from the outside and inside.

As illustrated in FIG. 9A, the roller support plate 71 of each conveyor belt support mechanism 70 includes a flat plate portion 71a in a straight shape fixed to the support shaft 12 and extending in the inward and outward direction, an extension portion 71b extending downward from the outer end of the flat plate portion 71a and extending outwardly, and a pendent portion 71c extending downwardly from the portion of the inner side with respect to the outer end of the flat plate portion 71a. The outer side support roller 72 is rotatably supported on the lower surface of the outer extension portion of the extension portion 71b. The inner side support roller 73 is formed in a truncated cone shape and is rotatably supported on the outer surface of the pendent portion 71c. Further, an auxiliary guide roller 74 is rotatably supported between the inner surface of the downward extending portion of the extension portion 71b and the outer surface of the pendent portion 71c. This auxiliary guide roller 74 guides the upper edge portion 41 of the conveyor belt 40 when the upper edge portion 41 moves upward.

Also, in the horizontal conveyance unit 4 positioned on the upper side of the support frame 10, as illustrated in FIG. 3, each conveyor belt support mechanism 70 is attached to each of the plurality of support shafts 15 except the support shafts 15 where the outgoing path side seventh guide pulley 27 and the returning path side first guide pulley 31 are supported. The structure of the conveyor belt support mechanism 70 is the same as that of the conveyor belt support mechanism 70 described above.

Furthermore, in the horizontal conveyance unit 2 located on the lower side of the conveyance path, as illustrated in FIG. 1 and FIG. 4, at positions other than the area where the conveyor belt 40 is in the expanded state, a plurality of support shafts 14 are provided to extend in the installation direction of the support shaft 12. Each conveyor belt support mechanism 70 is attached to each of the plurality of support shafts 14 except the support shaft 14 where the lower side turning pulley 52 is supported. The structure of the conveyor belt support mechanism 70 is the same as that of the conveyor belt support mechanism 70 described above.

Figure 8:
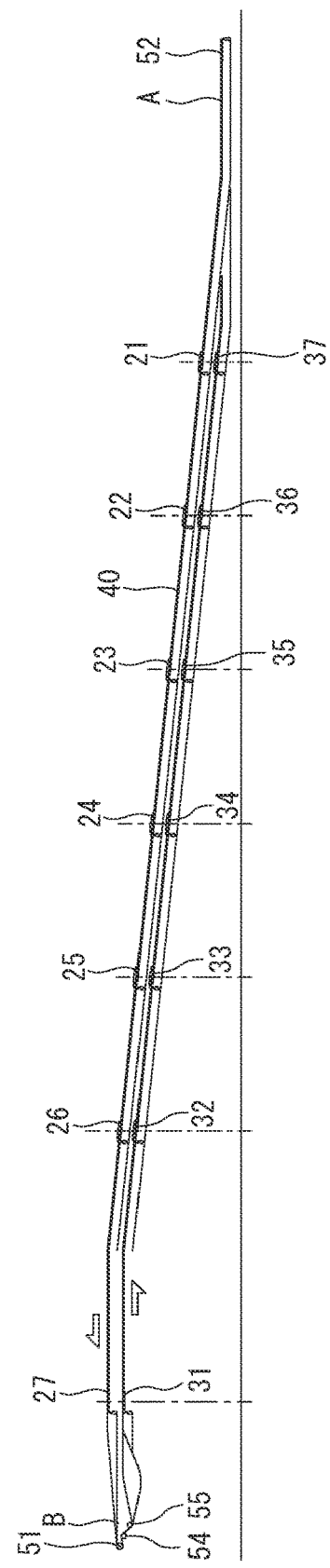
FIG. 8 is an expanded view of the conveyor apparatus illustrated in FIG. 1.

In the conveyor apparatus 1 thus configured, as illustrated in an expanded manner in FIG. 8, at the outgoing path side, at the horizontal conveyance unit 2, the conveyor belt 40 in the bent state where the conveyor belt is folded in two in the width direction is folded back with the lower side turning pulley 52. Thereafter, as illustrated in FIG. 4, the conveyor belt 40 is caused to be once in the expanded state where the conveyor belt is expanded in the width direction in the vicinity A of the turning position. At this time, a widening member 42 is inserted in to the conveyor belt 40 in the in the bent state where the conveyor belt is folded in two in the width direction, and the conveyor belt 40 is expanded in the width direction by the action of the widening member 42. Then, the conveyor belt 40 is caused to be again in the bent state where the conveyor belt is folded in two in the width direction by the action of the conveyor belt support mechanism 70. The belt is conveyed up to the outgoing path side first guide pulley 21 of the vertical conveyance unit 3.

The conveyor belt 40 in the bent state where the conveyor belt is folded in two in the width direction is sequentially guided along the outer circumference of the outgoing path side first guide pulley 21, the outer circumference of the outgoing path side second guide pulley 22, the outer circumference of the outgoing path side third guide pulley 23, the outer circumference of the outgoing path side fourth guide pulley 24, the outer circumference of the outgoing path side fifth guide pulley 25, and the outer circumference of the outgoing path side sixth guide pulley 26 in this order, and the conveyor belt 40 is conveyed to spirally rise in the support frame 10 while changing the direction by 90 degrees at the inflection point P11 to P16 of the outgoing path side first to the sixth guide pulleys 21 to 26.

Herein, each outgoing path side first to sixth guide pulleys 21 to 26 has an extremely large diameter as compared with the support shaft 12. Therefore, the curvature of the conveyor belt 40 guided along the outer circumference of the outgoing path side first to the sixth guide pulleys 21 to 26 is small. This makes it possible to reduce running resistance of the conveyor belt 40.

The conveyor belt 40 guided along the outer side of the outgoing path side sixth guide pulley 26 is guided, in the horizontal conveyance unit 4, along the outer side of the outgoing path side seventh guide pulley 27 to be turned 90 degrees in the bent state where the conveyor belt is folded in two in the width direction.

Herein, in the outgoing path side, the upper edge portion of the bent state conveyor belt 40 folded in two in the width direction is supported by the plurality of conveyor belt support mechanisms 70. Therefore, the bent state of the conveyor belt 40 is reliably maintained. Each conveyor belt support mechanism 70 sandwiches and supports, from the outside and inside, the upper edge portion 41 of the bent state conveyor belt folded in two in the width direction by the outer side support roller 72 and the inner side support roller 73. Therefore, the running resistance of the conveyor belt 40 can be reduced.

The auxiliary guide roller 74 guiding the upper edge portion 41 when the upper edge portion 41 of the conveyor belt 40 moves upward is rotatably supported between the inner surface of the downwardly extending portion of the extension portion 71b supporting the outer side support roller 72 and the outer surface of the pendent portion 71c supporting the inner side support roller 73. Therefore, even if the upper edge portion 41 of the conveyor belt 40 moves upward, the traveling of the conveyor belt 40 is guided by the auxiliary guide roller 74 and does not become a resistance.

Then, in the bent state where the conveyor belt is folded in two in the width direction, the conveyor belt 40, turned by being guided along the outer side of the outgoing path side seventh guide pulley 27, is caused to be in the expanded state where the conveyor belt is expanded in the width direction at the vicinity B of the turning position of the horizontal conveyance unit 4, and as illustrated in FIG. 7, the conveyor belt 40 is folded back in the expanded state with the upper side turning pulley 51.

Then, the conveyor belt 40 folded back in the expanded state with the upper side turning pulley 51 passes through the guide rollers 54, 55, and thereafter, the conveyor belt 40 is caused to be in the bent state where the conveyor belt is folded in two in the width direction on the front side of the returning path side first guide pulley 31 by the action of the conveyor belt support mechanism 70.

The conveyor belt 40 bent in the width direction and folded in two is guided along the outer circumference of the returning path side first guide pulley 31 and at the returning path side, the conveyor belt 40 is conveyed to the outgoing path side second guide pulley 32 of the vertical conveyance unit 3.

The conveyor belt 40 in the bent state where the conveyor belt is folded in two in the width direction is sequentially guided along the outer circumference of the returning path side second guide pulley 32, the outer circumference of the returning path side third guide pulley 33, the outer circumference of the returning path side fourth guide pulley 34, the outer circumference of the returning path side fifth guide pulley 35, the outer circumference of the returning path side sixth guide pulley 36, and the outer circumference of the returning path side seventh guide pulley 37 in this order, and the conveyor belt 40 is conveyed to descend spirally in the support frame 10 while changing the direction by 90 degrees at the inflection point P16 to P11 of the returning path side second to seventh guide pulleys 32 to 37.

Herein, each of returning path side second to seventh guide pulley 32 to 37 has an extremely large diameter as compared with support shaft 12. Therefore, the curvature of the conveyor belt 40 guided along the outer circumference of the returning path side second to seventh guide pulleys 32 to 37 is small. This makes it possible to reduce running resistance of the conveyor belt 40.

Then, the conveyor belt 40 guided along the outer side of the returning path side seventh guide pulley 37 is conveyed up to the lower side turning pulley 52 in the horizontal conveyance unit 2 in the bent state where the conveyor belt is folded in two in the width direction.

Then, as long as the drive motor is driving, the conveyor belt 40 repeatedly performs the outgoing path side operation and the returning path side operation and endlessly circulates.

Herein, in the returning path side, the upper edge portion of the bent state conveyor belt 40 folded in two in the width direction is supported by the plurality of conveyor belt support mechanisms 70, and therefore, the bent state of the conveyor belt 40 is reliably maintained. Each conveyor belt support mechanism 70 sandwiches and supports the upper edge portion 41 of the bent state conveyor belt folded in two in the width direction by the outer side support roller 72 and the inner side support roller 73 from the outside and inside. Therefore, the running resistance of the conveyor belt 40 can be reduced.

An auxiliary guide roller 74, guiding the upper edge portion 41 of the conveyor belt 40 when the upper edge portion 41 moves upward, is rotatably supported between the inner surface of the downwardly extending portion of the extension portion 71b supporting the outer side support roller 72 and the outer surface of the pendent portion 71c supporting the inner side support roller 73. Therefore, even if the upper edge portion 41 of the conveyor belt 40 moves upward, the traveling of the conveyor belt 40 is guided by the auxiliary guide roller 74 and does not become a resistance.

Hereinafter explained is a method of carrying the soil excavated from the underground excavation site by the conveyor apparatus 1 constituted as described above to the ground via the vertical shaft.

At the horizontal conveyance unit 2 at the outgoing path side of the conveyor belt 40, when the conveyor belt 40 is expanded in the width direction in the vicinity A of the turning position, the soil excavated from the underground excavation site is placed on the conveyor belt 40. Then, when the conveyor belt 40 is in the bent state where the conveyor belt 40 is folded in two in the width direction, the placed excavation soil is held to be surrounded by the conveyor belt 40. While the retained state is maintained by the conveyor belt 40, the excavation soil spirally ascends through the vertical conveyance unit 3 while changing the direction by 90 degrees at the inflection point P11 to P16 of the outgoing path side first to sixth guide pulleys 21 to 26, and the excavation soil is conveyed to the horizontal conveyance unit 4.

And at the horizontal conveyance unit 4, the excavation soil is turned by 90 degrees with outgoing path side seventh guide pulley 27 together with the conveyor belt 40 while being held to be surrounded by the conveyor belt 40. The excavation soil can then be removed from the conveyor belt 40 when the conveyor belt 40 is caused to be in the expanded state where the conveyor belt is expanded in the width direction in the vicinity B of the turning position.

Therefore, the excavation soil can be unloaded continuously from the conveyor belt 40 in the vicinity B of the turning position.

Then, the conveyor belt 40 from which the excavation soil has been removed is folded back in the expanded state by the upper side turning pulley 51 and passes through the guide rollers 54, 55, and thereafter, with the action of the conveyor belt support mechanism 70, the conveyor belt 40 is caused to be in the bent state where the conveyor belt is folded in two in the width direction on the front side of the returning path side first guide pulley 31.

Then, the conveyor belt 40 is turned by the returning path side first guide pulley 31 while being in the bent state where the conveyor belt is folded in two in the width direction at the returning path side, and furthermore, the conveyor belt 40 spirally descends in the vertical conveyance unit 3 while changing the direction by 90 degrees at the inflection points P16 to P11 of the returning path side second to seventh guide pulleys 32 to 37, and the conveyor belt 40 is conveyed to the horizontal conveyance unit 2 to return to the original position.

In this way, according to the conveyor apparatus 1, the continuous conveyance in the vertical direction is enabled without having a complicated device configuration. Further, continuous conveyance in the horizontal and vertical directions and in the horizontal direction is enabled with a single conveyor apparatus.

Herein, in both the outgoing path side and the returning path side of the conveyor belt 40, the conveyor belt 40 are in the bent state where the conveyor belt is folded in two in the width direction in the conveyance excluding the vicinities A and B of the turning positions, and the excavation soil is held to be surrounded by the conveyor belt 40, and therefore, the spillage of the cargo can be prevented or suppressed.

Furthermore, in both the outgoing path side and the returning path side, the conveyor belt 40 is in the bent state where the conveyor belt is folded in two in the width direction in the conveyance excluding the vicinities A and B of the turning positions, and therefore, the conveyor belt can lift soil by conveying the excavation soil at the outgoing path side, and convey other items such as materials on the returning path side where the excavation soil has been removed.

Furthermore, both the outgoing path side and the returning path side of the conveyor belt 40 are in the bent state where the conveyor belt is folded in two in the width direction in the conveyance excluding the vicinities A and B of the turning positions. Even when there are large stones and small sand mixed in the excavation soil, the excavation soil enclosing those big stones and small sand can be wrapped and conveyed by the conveyor belt 40.

In both of the outgoing path side and the returning path side, the conveyor belt 40 is in the bent state where the conveyor belt is folded in two in the width direction in the conveyance excluding the vicinities A and B of the turning positions, and the excavation soil is held to be surrounded by the conveyor belt 40, and therefore, even when emergency stop occurs during the conveyance, there is no fear of the spillage of the cargo.

The upper side turning pulley 51, the outgoing path side first guide pulley 21, the outgoing path side third guide pulley 23, and the outgoing path side fifth guide pulley 25 are provided with drive motors respectively driving the guide pulleys at a plurality of locations in a dispersed manner, and therefore, the tension of the conveyor belt can be reduced.

Although the embodiments of the present invention have been described above, the present invention is not limited thereto and various modifications and improvements can be made.

For example, the conveyor apparatus 1 is used not only to transport soil excavated from underground excavation sites via a vertical shaft or an inclined shaft to the ground through the vertical shaft, but also to convey the stored materials such as coal to the silos that store the stored materials.

In the conveyor apparatus 1, the horizontal conveyance units 2, 4 are not always necessary. In this case, the conveyor belt 40 is folded back at the turning positions of the upper side and the lower side in the conveyance direction of the vertical conveyance unit 3 extending in the vertical direction, and is caused to be in the expanded state where the conveyor belt is expanded in the width direction at the vicinity of each turning position. In addition, the lower side turning pulley 52 and the upper side turning pulley 51 may guide and support the conveyor belt 40 so as to stretch the conveyor belt at the respective turning positions instead of the horizontal conveyance units 2 and 4.

The position P1 to P6 forming the inflection points P11 to P16, where the outgoing path side first to sixth guide pulleys 21 to 26 and the returning path side second to seventh guide pulleys 37 are disposed, do not necessarily have to be set at corner portions in a polygonal shape including a quadrangular shape when viewed from above. For example, position P1 to P6 forming the inflection points P11 to P16 may be set at corner portions in a Z shape when viewed from above.

The positions P1 to P6 forming the inflection points P11 to P16 do not necessarily have to be set at corner portions of the support frame 10 having a polygonal shape including a quadrangular shape when viewed from above. The outgoing path side guide pulleys and the returning path side guide pulleys may be disposed at the positions forming the inflection points P11 to P16 other than the corner portions of the support frame 10 (for example, other members disposed in the vertical shaft).

The support frame 10 may not have a quadrangular shape when viewed from above and may have be in other polygonal shapes.

The support frame 10 may be disposed in such a manner that the axis of the support frame 10 extends in a vertical direction and has a polygonal shape when viewed from above and the plurality of support shafts 12 do not necessarily have to be disposed to form a polygonal shape when viewing from above.

The height of the support frame 10 in the vertical conveyance unit 3 may be adjusted according to the height of the vertical shaft, and the numbers of outgoing path side guide pulleys and returning path side guide pulleys are not limited to seven, and are determined by the height of the support frame 10 and the arrangement pitch in the helical conveyance path.

The drive motor 60 is connected to the upper side turning pulley 51, and a plurality of drive motors, not illustrated, are connected to the outgoing path side first guide pulley 21, the outgoing path side third guide pulley 23, and the outgoing path side fifth guide pulley 25. The drive motor may be connected to drive at least one of the outgoing path side first to seventh guide pulleys 21 to 27, the returning path side first to seventh guide pulleys 31 to 37, the upper side turning pulley 51, and the lower side turning pulley 52.

Figure 10:
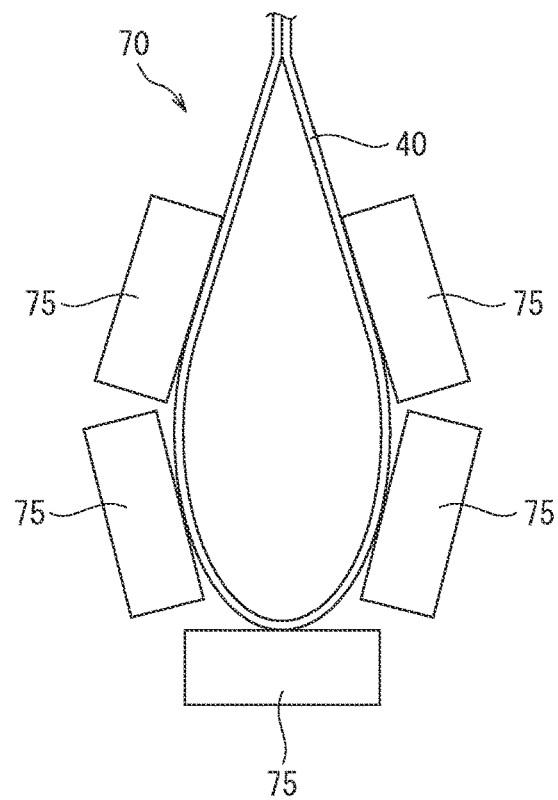
FIG. 10 is a schematic diagram illustrating a modification of the conveyor belt support mechanism.

The structure of the conveyor belt support mechanism 70 is not limited to the examples illustrated in FIGS. 9A and 9B. For example, as illustrated in FIG. 10, a plurality of rollers 75 disposed on a bracket of which lower side is supported (not illustrated) may be arranged along the outer circumference of a conveyor belt 40 folded back in two.

The outgoing path side first to sixth guide pulleys 21 to 26 and the returning path side second to seventh guide pulleys 32 to 37 may not be necessarily disposed to form a pair of upper and lower ones, and may be disposed right and left in parallel.

Figure 11:
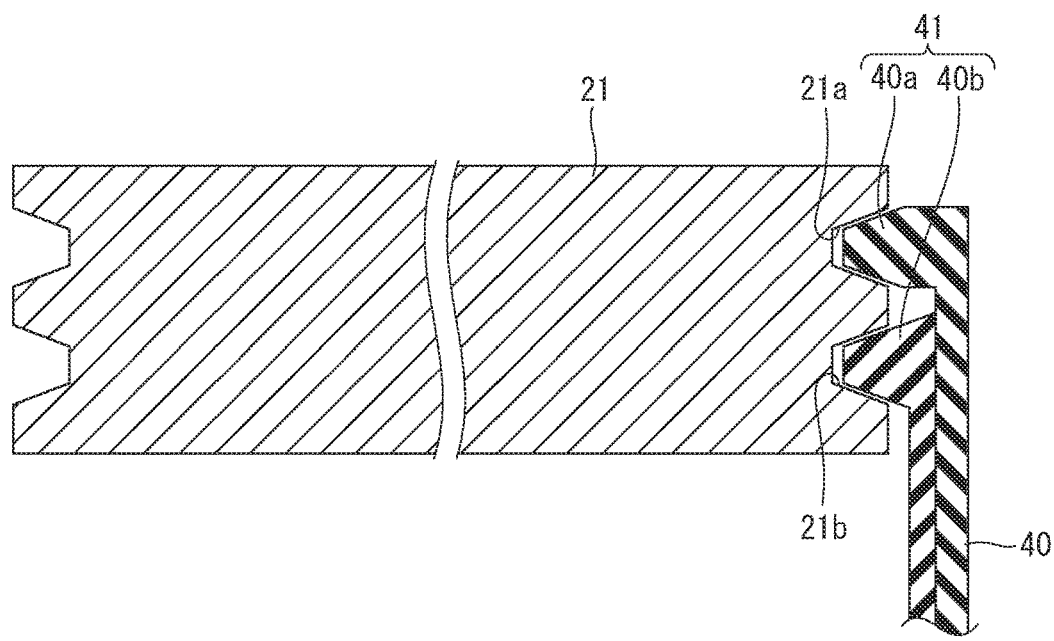
FIG. 11 is a cross-sectional view illustrating how the upper edge portion of the conveyor belt is supported on the outer circumference of the outgoing path side first guide pulley.

FIG. 11 illustrates how the upper edge portion 41 of the conveyor belt 40 is supported on the outer circumference of the outgoing path side first guide pulley 21. Herein, on the outer circumference surface of the outgoing path side first guide pulley 21, a first recessed portion 21a having a trapezoidal cross sectional shape is formed endlessly in the circumferential direction, and on the lower side of the first recessed portion 21a, the second recessed portion 21b having a trapezoidal cross sectional shape is formed endlessly in the circumferential direction. The end portion 40a on one side of the conveyor belt 40 constituting the upper edge portion 41 of the conveyor belt 40 is formed into a trapezoidal cross sectional shape having a complementary shape with the first recessed portion 21a, and fitted in the first recessed portion 21a to be supported. On the other hand, the end portion 40b on the other side of the conveyor belt 40 constituting the upper edge portion 41 of the conveyor belt 40 is formed into a trapezoidal cross sectional shape having a complementary shape with the second recessed portion 21b, and fitted in the second recessed portion 21b to be supported.

In this way, the end portion 40a on one side of the conveyor belt 40 is fitted and supported in the first recessed portion 21a of the outgoing path side first guide pulley 21, and the end portion 40b on the other side of the conveyor belt 40 is fitted and supported in the second recessed portion 21b of the outgoing path side first guide pulley 21, and in this state, the conveyor belt 40 is wound around the outer circumference of the outgoing path side first guide pulley 21. Although not illustrated, also on the outer circumference surfaces of all of the outgoing path side second to seventh guide pulleys 22 to 27 and the returning path side first to seventh guide pulleys 31 to 37, the first recessed portion 21a having the trapezoidal cross section in which the end portion 40a on one side of the conveyor belt 40 formed in the trapezoidal cross section is fitted is formed endlessly in the circumferential direction, and on the lower side of the first recessed portion 21a, the second recessed portion 21b formed in the trapezoidal cross section in which the end portion 40b on the other side of the conveyor belt 40 formed in the trapezoidal cross section is fitted and formed endlessly in the circumferential direction. Therefore, the upper edge portion 41 of the conveyor belt 40 does not slide upward and downward, and the conveyor belt 40 is supported by the outer circumference surface of the outgoing path side first to seventh guide pulleys 21 to 27 and the returning path side first to seventh guide pulleys 31 to 37 by appropriate frictional force achieved by concavo-convex fitting, and therefore, the conveyor belt 40 can appropriately and reliably circulate endlessly.

A list of reference numbers in the drawings is described below.
1 conveyor apparatus
2 horizontal conveyance unit
3 vertical conveyance unit
4 horizontal conveyance unit
10 support frame
11 bottom plate
12 support shaft
13 top plate
14 support shaft
15 support shaft
21 outgoing path side first guide pulley (outgoing path side guide pulley)
22 outgoing path side second guide pulley (outgoing path side guide pulley)
23 outgoing path side third guide pulley (outgoing path side guide pulley)
24 outgoing path side fourth guide pulley (outgoing path side guide pulley)
25 outgoing path side fifth guide pulley (outgoing path side guide pulley)
26 outgoing path side sixth guide pulley (outgoing path side guide pulley)
27 outgoing path side seventh guide pulley (outgoing path side guide pulley)
31 returning path side first guide pulley (returning path side guide pulley)
32 returning path side second guide pulley (returning path side guide pulley)
33 returning path side third guide pulley (returning path side guide pulley)
34 returning path side fourth guide pulley (returning path side guide pulley)
35 returning path side fifth guide pulley (returning path side guide pulley)
36 returning path side sixth guide pulley (returning path side guide pulley)
37 returning path side seventh guide pulley (returning path side guide pulley)
40 conveyor belt
40a end portion on one side
40b end portion on the other side
41 upper edge portion
42 widening member
51 upper side turning pulley
52 lower side turning pulley
53 support member
54, 55 guide roller
60 drive motor
70 conveyor belt support mechanism
71 roller support plate
71a flat plate portion
71b extension portion
71c pendent portion
72 outer side support roller
73 inner side support roller
74 auxiliary guide roller
A proximity at turning position of horizontal conveyance unit located on lower side of conveyance path
B proximity at turning position of horizontal conveyance unit located on upper side of conveyance path
P1 to P6 positions forming inflection point
P11 to P16 inflection points of conveyance path

The invention claimed is:

1. A conveyor apparatus comprising:
a plurality of outgoing path side guide pulleys and a plurality of returning path side guide pulleys disposed along a helical conveyance path extending in a vertical direction and arranged at positions where inflection points of the helical conveyance path are formed such that the plurality of outgoing path side guide pulleys and the plurality of returning path side guide pulleys form the inflection points;
an endless conveyor belt wound around the plurality of outgoing path side guide pulleys in turn along the helical conveyance path in a bent state where the endless conveyor belt is folded in two in a width direction in such a manner that an upper edge portion of the endless conveyor belt is supported by the plurality of outgoing path side guide pulleys, the endless conveyor belt being wound around the plurality of returning path side guide pulleys in turn along the helical conveyance path in the bent state where the endless conveyor belt is folded in two in the width direction in such a manner that the upper edge portion is supported by the plurality of returning path side guide pulleys, and further, the endless conveyor belt being folded back at turning positions of an upper side and a lower side of the helical conveyance path and being in an expanded state where the endless conveyor belt is expanded in the width direction in a vicinity of each of the turning positions;
a pair of an upper side turning pulley and a lower side turning pulley configured to support and guide the endless conveyor belt to stretch at the respective turning positions; and
drive motors configured to drive pulleys among some or all of the plurality of outgoing path side guide pulleys, the plurality of returning path side guide pulleys, the upper side turning pulley, and the lower side turning pulley,
wherein the drive motors are provided in a dispersed manner at some positions among positions of the plurality of outgoing path side guide pulleys forming the inflection points, the plurality of returning path side guide pulleys forming the inflection points, the upper side turning pulley, and the lower side turning pulley,
on each of outer circumference surfaces of the plurality of outgoing path side guide pulleys and the plurality of returning path side guide pulleys, a first recessed portion and a second recessed portion each having a trapezoidal cross sectional shape are formed endlessly in a circumferential direction, the second recessed portion being formed on the lower side of the first recessed portion, one end portion on one side of the endless conveyor belt being formed into a trapezoidal cross sectional shape and fitted into the first recessed portion, and another end portion of another side of the endless conveyor belt being formed into a trapezoidal cross sectional shape and fitted into the second recessed portion, the position where the inflection points are formed are set at corner portions of a support frame having an axis extending in a vertical direction and having a polygonal shape when viewed from above, the upper edge portion of the endless conveyor belt in the bent state where the endless conveyor belt is folded in two in the width direction include: the one end portion of the endless conveyor belt disposed at an upper side; and the another end portion of the endless conveyor belt having an inclined lower surface, the another end portion being vertically arranged at a lower side with respect to the one end portion, and is supported by a supported by a plurality of conveyor belt support mechanisms.

2. The conveyor apparatus according to claim 1, wherein each of the conveyor belt support mechanisms includes:
 a roller support plate attached on each of a plurality of support shafts located between the corner portions of the support frame to protrude outwardly;
 an outer side support roller attached to a position at an outer side spaced apart from a support shaft of the roller support plate; and
 an inner side support roller attached to a position at an inner side with respect to the outer side support roller of the roller support plate, wherein the outer side support roller comes in contact with an outer surface of the one end portion of the endless conveyor belt,
the inner side support roller is formed in a truncated cone shape and comes in contact with the inclined lower surface of the another end portion of the endless conveyor belt disposed at the lower side with respect to the one end portion, and
the outer side support roller and the inner side support roller sandwich and support, from outside and inside, the upper edge portion of the endless conveyor belt in the bent state where the endless conveyor belt is folded in two in the width direction.

3. The conveyor apparatus according to claim 2, wherein the support frame includes the plurality of support shafts disposed in such a manner that an axis extends in a vertical direction, and the plurality of support shafts are disposed such that the plurality of support shafts form a polygonal shape transverse section, and
 the plurality of outgoing path side guide pulleys and the plurality of returning path side guide pulleys are respectively disposed on the plurality of support shafts located at the corner portions of the support frame set at the positions where the inflection points are formed.

4. The conveyor apparatus according to claim 1, wherein the support frame includes a plurality of support shafts disposed in such a manner that an axis extends in a vertical direction, and the plurality of support shafts are disposed such that the plurality of support shafts form a polygonal shape transverse section, and
 the plurality of outgoing path side guide pulleys and the plurality of returning path side guide pulleys are respectively disposed on the plurality of support shafts located at the corner portions of the support frame set at the positions where the inflection points are formed.

* * * * *